455-614 AU 233 EX 230
FIP8106 OR 3,065,352
EXAMINER 77

828,120
Nov. 20, 1962 R. B. McFARLANE 3,065,352

BEAM COMMUNICATION SYSTEM

Filed July 20, 1959

INVENTOR.
RICHARD B. McFARLANE
BY
Bruce + Brosler
HIS ATTORNEYS

United States Patent Office 3,065,352
Patented Nov. 20, 1962

3,065,352
BEAM COMMUNICATION SYSTEM
Richard B. McFarlane, 36 May Court, Hayward, Calif.
Filed July 20, 1959, Ser. No. 828,120
6 Claims. (Cl. 250—199)

My invention relates to a communication system and more particularly to a system for communication via a light beam.

Among the objects of my invention are:

(1) To provide a novel and improved light beam communication system;

(2) To provide a novel and improved light beam communication system which is basically so simple and efficient that it may be constructed cheaply, and accordingly lend itself to manufacture as a toy;

(3) To provide a novel and improved light beam modulator-transmitter;

(4) To provide a novel and improved light beam modulator-transmitter adapted to utilize the sun as its source of light;

(5) To provide a novel and improved light beam modulator-transmitter of extremely simple construction and high efficiency;

(6) To provide a novel and improved detector for a modulated light beam;

(7) To provide a novel and improved modulated light beam detector having high efficiency and sensitivity;

(8) To provide a novel and improved modulated light beam detector which is self-powered, and accordingly, requires no independent source of power;

(9) To provide a novel and improved modulated light beam detector which will function efficiently, even in the presence of strong background light.

Additional objects of my invention will be brought out in the following description in a preferred embodiment of the same, taken in conjunction with the accompanying drawings wherein FIG. 1 is a light beam communication system embodying the features of the present invention;

Figures 1, 2, 3, 4:
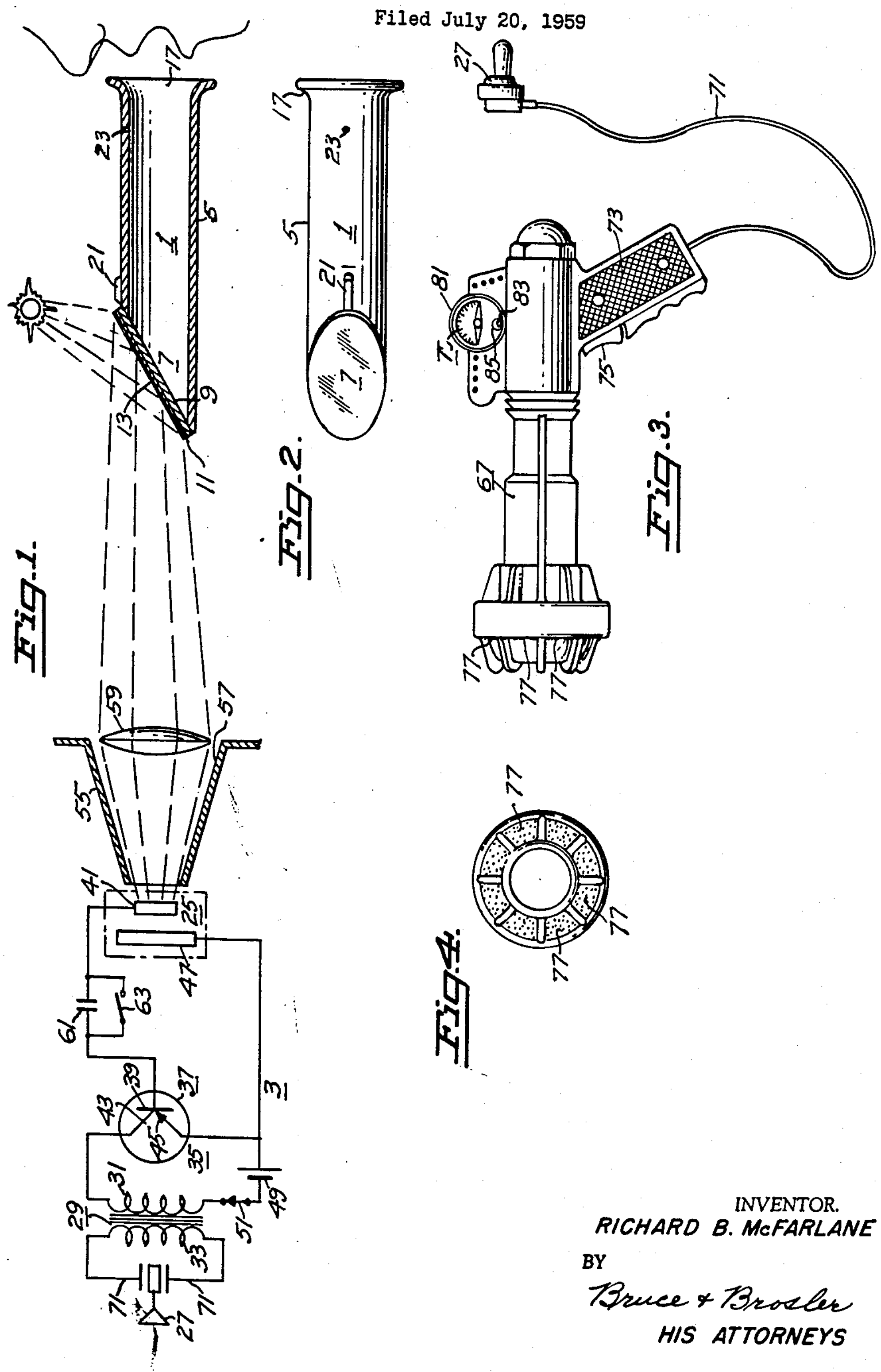
FIG. 2 is a view depicting the modulator-transmitter of the said system.
FIG. 3 is a view in side elevation of the light beam detector as incorporated into a pistol type housing.
FIG. 4 is a front view in elevation of the detector of FIG. 3.

Referring to the drawings for details of my invention in its preferred form, the system depicted therein involves a combination modulator-transmitter 1 for use in modulating and transmitting a light beam, and a detector 3 for receiving and interpreting such modulated light beam.

The modulator-transmitter is extremely simple and entirely mechanical, and involves a tube 5 having one end lying in a plane at an angle of the order of 45 degrees to the longitudinal axis of the tube. When the tube is of circular cross-section as shown, the angularly disposed end will be of oval shape with the smaller diameter equal to the diameter of the tube, thus enclosing considerably more area than a cross-section through the tube normal to the axis thereof, this as will be seen, being of considerable importance to the present invention.

Spanning the angularly disposed end of the tube and completely covering the same, is a light, flexible, opaque mirror 7 with its light reflecting surface facing outwardly of the tube.

While this mirror might be formed of thin metallic sheet material, such would present problems in that the metal would have to be highly polished to provide a mirror surface, but aside from this, thin sheet metal material exhibits a tendency to wrinkle and develop crease lines, or otherwise depart from a planar surface, which would impair its efficiency to function for the purpose of the present invention.

Accordingly, in lieu of utilizing sheet metal material for the mirror, I prefer to employ thin sheet plastic material 9 as a base, on which a coating 11 of silver or other good light reflecting metal is deposited, preferably to a thickness sufficient to render the mirror opaque, and then protect the metal coating with a very thin transparent protective covering 13 of clear plastic. Such material being highly flexible, will retain its planar characteristic with little if any tendency to develop wrinkles or crease lines.

Light rays striking the mirror will be reflected therefrom in accordance with the physical law that the angle of reflection equals the angle of incidence. Thus, with the mirror exposed directly to the sun, light rays of substantial intensity will strike the mirror and be reflected therefrom, the angle of incidence and consequently the angle of reflection being changeable by changing the angle of exposure of the mirror to the sun. This makes it possible therefore to aim the reflected light rays toward a remote point or station where a detector 3 may be located to receive such light rays.

The transparent covering 13 aside from its function of protecting the coating of silver, effects a more primary function in enhancing the modulation of the light beam striking the mirror. This may be attributed to the phenomenon of refraction, which alters the linear distances which the light rays travel in the transparent covering with changes in angle of incidence brought about by the impinging sound waves. This in turn results in a greater or less absorption of light energy constituting in and of itself, a type of modulation.

The opposite end 17 of the tube is left open and by speaking into this end of the tube, the resulting sound waves impinging upon the back side of the mirror, will cause the mirror to vibrate in accordance with the frequencies involved, and accordingly modulate the reflected light rays.

To enhance the efficiency of the tube as a transmitter, the tube is flared somewhat at its open end to an increased portion of the energy of the spoken word entering the tube, thereby increasing the modulating effect.

By reason of the increased area encompassed by the mirror when disposed at an angle to the longitudinal axis of the tube, as pointed out previously, the quantity of light receivable on the mirror and reflected thereby, will be substantially greater than could be realized with the mirror disposed transversely of the tube for corresponding positions.

By reason of the fact that the mirror has a long axis as well as a short axis, the maximum quantity of light capable of being received on the mirror for any given directional position of the tube can be realized only when this longer axis of the mirror lies in the general plane of the sun's rays approaching the mirror. To enable an operator to judge this position of the mirror while talking into the tube, I provide a maximum light orientation guide 21 preferably in the form of a nib or rib on the tube adjacent an end of the long axis of the mirror. After aiming the reflected light rays toward a remotely located detector, then by rotating the tube about its longitudinal axis until this nib or rib lies in the general plane of the oncoming rays of the sun, maximum light will impinge on the mirror for the prevailing direction of the tube, and consequently, the maximum quantity of reflected light will reach the detector.

To prevent overloading of the mirror and the probability of damaging the same, I provide a pressure release opening 23 in the wall of the tube 5.

At the receiving station of the communication system, is the detector 3 which comprises a circuit including a photo-electric cell 25 of the self-generating type, examples of which are the selenium cell, the copper-oxide cell, the silicon cell and the lead sulphide cell.

Such photo-cell is connected into a circuit which in its most basic form, includes a sound reproducer 27 preferably of the crystal type built into the form of an ear plug, this sound reproducer, which normally has an impedance substantially higher than that of the photo-electric cell 25, is coupled to the cell by a matching transformer 29 having a primary winding 31 in circuit with the photo-electric cell and a secondary winding 33 in circuit with the crystal sound reproducer. Such circuit is self-powered in that no independent source of power is necessary, the operation of the circuit depending on the voltages generated within the photo-cell by light striking such cell.

The sensitivity of the basic circuit may be substantially increased by the inclusion of one or more stages 35 of amplification, preferably stages, each utilizing a transistor 37. Only one such stage is being depicted in the detector portion of the system of FIG. 1. When so included, the base electrode 39 will be connected to one electrode 41 of the photocell, the collector electrode 43 to one end of the primary winding 31 of the matching transformer, while the emitter 45 is connected to both the other electrode 47 of the photo-electric cell and to the remaining side of the primary winding of the matching transformer, through a polarizing battery 49 and a manual switch 51 in series therewith. The detector remains self-powered despite the presence of the battery, which serves merely as a polarizer and not as a power supply source, as may be established by the fact that the system will function without such battery in the circuit.

Light impinging upon the photo-cell 25, will, in the basic circuit, set up a corresponding current in the primary circuit of the matching transformer 29, and when such light is modulated, the resulting modulated current in the primary circuit of the transformer will produce a voltage in the secondary winding of corresponding characteristics, which would be interpreted then by the sound reproducer, 27, by converting the same into sound waves.

A greater quantity of light transmitted from modulator-transmitter 1 at a distant point may be intercepted by the photo-cell 25 of the detector by providing such cell with a light gathering means in the form of a tube 55 preferably of funnel shape, supported with its small end adjacent the photo-cell and provided with an inner surface 57 having high light reflecting qualities. This can be realized by forming the tube from paper or plastic having a coating of metal thereover such as silver, which in turn, like the mirror at the modulator-transmitter station, can be protected by a thin coating of transparent plastic. Admirably adapted for this purpose is thin sheet material customarily employed in making sequins which are utilized in large measure as adornments on women's clothes.

Light entering the central longitudinal region of the funnel shape tube will strike the photo-cell directly, while other light entering the tube will be reflected from the inner surface thereof and ultimately will be dispersed over the surface of the photo-cell. Accordingly, while the funnel shaped tube will trap a substantially greater quantity of light from a distant source, than would otherwise strike the photo-cell without such light gathering means, the funnel shaped tube offers the additional advantage of dispersing such light over the entire surface of the photo-cell, so that the entire surface of the cell will become substantially uniformly activated.

A lens 59 may be added to the light gathering means, in which case, it will be disposed across the larger end of the tube, and through the use of such lens, the light entering the tube may be limited more closely to light emanating from a particular source such as a modulator-transmitter at some remote point.

The presence of a heavy, steady background of light, as might well exist when transmitting on a bright, sunny day, might produce such a heavy direct current component in the photo-cell circuit as could conceivably overload the photo-cell.

One remedy for avoiding such overloading, would be to introduce sufficient resistance in the photo-cell circuit as to limit the possible flow of current therein under the most adverse conditions to be expected. This may be realized either by selecting a transformer having a primary with the required amount of resistance, or in lieu thereof, introducing the required resistance in the circuit.

A more effective manner of accomplishing this purpose would be to insert a blocking condenser 61 in series with the photo-cell 25 whereby no direct current can flow in the photo-cell circuit, and consequently, in spite of the existence of a high, steady background level of light, no current flows through the photo-cell due to such steady light background can occur, and all the current in the photo-cell circuit will therefore correspond to the modulations only of the incoming light beam.

In the event the background light level be sufficiently low as to cause no difficulty, the condenser could be shorted out by a manually operable switch 63 connectable across it, so as to effectively remove it from the circuit.

The electron acceleration in self-generating photo-cells is dependent upon light color as distinguished from light quantity. To enhance the efficiency of the photo-cell receiving circuit therefore, I prefer to make the reflector at the transmitter, the color to which the cell is most sensitive, thereby avoiding modulating and transmitted color light at frequencies which would produce low velocity electrons, which in turn would bring about a cancellation effect upon the desired higher velocity electrons produced by the color to which the photo-cell is most sensitive.

The detector circuit as described might, to advantage, be built into a pistol type housing 67, in which case, the leads 71 to the sound reproducer 27 can emerge from the handle 73 of the housing, while the circuit opening and closing switch 51 might be made responsive to operation of a trigger 75.

At some point alongside the light gathering means 55, and perferably about the entrance thereto, I provide light reflecting means, preferably in the form of fluorescent or refracting material on tape 77, which may be obtained in different colors, and when disposed in a plane normal to the axis of the light gathering means, a portion of the light approaching the detector from some distant transmitter, will impinge upon this light reflecting surface and be reflected back to the source of the transmission, thus indicating to the operator at that point, that his transmitted light beam is being received by the detector.

In receiving in a horizontal plane, experience has shown that a person is inclined to tilt a pistol type housing upwardly. To guide such person in maintaining such housing level, I provide level guide means 79 in the form preferably, of a circular glass side housing 81 on the upper side of the pistol type housing, and a ball 83 inside said housing adapted to register with a marking 85 therein when the pistol housing is horizontally held.

With each party provided with a modulator-transmitter, 1 as well as a detector 3, two-way communication can be established, and each will then be informed as to his accuracy of aim and whether the other party is receiving what he is transmitting. The modulator-transmitter 1 in each such case might be swivel mounted on the gun housing 67 so as to form a unit assembly with the detector 3, thereby enabling such two-way communication over light beams to be carried on quite effectively.

From the foregoing description of my invention in its preferred form, it will be apparent that the same is subject to alteration and modifications without departing from the underlying principles involved, and while I have illustrated and described the preferred form of my invention in considerable detail, I do not desire to be limited in my protection to these specific details so illustrated and described except as may be necessitated by the appended claims:

I claim:

1. A light beam modulator-transmitter comprising a tube having a flared open end through which to project sound waves into the tube, and at its other end being cut on a bias to present an edge of oval shape, and a light, flexible mirror spanning said oval shaped edge and affixed to said tube, said modulator-transmitter having a pressure relief opening to protect said mirror against excessive sound wave pressures within said tube.

2. A light beam modulator-transmitter comprising a tube having an end through which to project sound waves into said tube, closure means spaced from said end and extending across said tube, said closure means having a reflective surface facing away from said end, said surface being disposed at an acute angle to the longitudinal axis of said tube, including a pressure relief opening in said tube to protect said closure means against excessive sound wave pressures within said tube.

3. A light beam modulator-transmitter comprising a tube having an end lying in a plane at an acute angle to the longitudinal axis of said tube, a mirror spanning said end of said tube with its light reflecting surface facing outwardly of said tube, said mirror having a long axis and a short axis, and a maximum light orientation guide for gauging maximum light reception from the sun by said mirror for a given directional position of said tube, said guide involving a rib on said tube in line with an end of said long axis.

4. A modulated light beam detector comprising a conically shaped tube having a highly reflective inner surface, a photo-detector disposed at the small end of said tube, and an electroacoustcal transducer connected to convert the output signal from said detector to an audible signal, including a diffusion type reflector in the form of an annulus around the large end of said tube, said reflector having a reflective surface substantially perpendicular to the longitudinal axis of said tube; said annular reflector being adapted ~~to return~~ toward a light source a portion of the incident light therefrom to indicate optical alignment between said photo-detector and said light source.

5. A light beam communicating system comprising, in combination, a transmitter and a receiver; said transmitter comprising a tube having an end through which to project sound waves into the tube, and at some other location, a vibratile mirror of a shape having a long axis and a short axis, said mirror spanning said tube at an acute angle to the longitudinal axis of said tube; said receiver having a funnel shaped housing with a reflective inner surface, a light sensitive detector disposed at the small end of said housing, an electroacoustical transducer connected to convert into an audible signal the output signal of said detector; and a reflector mounted on said housing to reflect toward said transmitter a portion of the incident light therefrom.

6. A light beam communicating system comprising, in combination, a transmitter and a receiver; said transmitter comprising a tube having an end through which to project sound waves into the tube, and at some other location, a vibratile mirror of a shape having a long axis and a short axis, said mirror spanning said tube at an acute angle to the longitudinal axis of said tube; said receiver having a funnel shaped housing with a reflective inner surface, a light sensitive detector disposed at the small end of said housing, an electroacoustical transducer connected to convert into an audible signal the output signal of said detector; and a diffusion reflector mounted on said housing to reflect toward said transmitter a portion of the incident light therefrom.

References Cited in the file of this patent

UNITED STATES PATENTS

| | | |
|---|---|---|
| D. 138,867 | Falge | Sept. 19, 1944 |
| D. 188,494 | Udell | Aug. 2, 1960 |
| 235,199 | Bell | Dec. 7, 1880 |
| 241,909 | Bell et al. | May 24, 1881 |
| 1,384,014 | Fessenden | July 5, 1921 |
| 1,642,001 | Chubb | Sept. 13, 1927 |
| 1,941,493 | Rubin | Jan. 2, 1934 |
| 2,027,595 | Knobel et al. | Jan. 14, 1936 |
| 2,173,994 | Anderson | Sept. 26, 1939 |
| 2,835,744 | Harris | May 20, 1958 |
| 2,849,623 | Drake | Aug. 26, 1958 |
| 2,921,203 | Hoffman | Jan. 12, 1960 |